US012341188B2

(12) United States Patent
Zhao et al.

(10) Patent No.: US 12,341,188 B2
(45) Date of Patent: Jun. 24, 2025

(54) SILICON-BASED NEGATIVE ELECTRODE MATERIAL, PREPARATION METHOD AND USE THEREOF

(71) Applicant: Zhuhai CosMX Battery Co., Ltd., Zhuhai (CN)

(72) Inventors: Wei Zhao, Zhuhai (CN); Suli Li, Zhuhai (CN); Hao Yuan, Zhuhai (CN); Weichao Tang, Zhuhai (CN); Junyi Li, Zhuhai (CN); Yanming Xu, Zhuhai (CN)

(73) Assignee: Zhuhai CosMX Battery Co., Ltd. (CN)

( * ) Notice: Subject to any disclaimer, the term of this patent is extended or adjusted under 35 U.S.C. 154(b) by 623 days.

(21) Appl. No.: 17/590,897

(22) Filed: Feb. 2, 2022

(65) Prior Publication Data

US 2022/0158178 A1    May 19, 2022

Related U.S. Application Data

(63) Continuation of application No. PCT/CN2020/107849, filed on Aug. 7, 2020.

(30) Foreign Application Priority Data

Aug. 7, 2019   (CN) .......................... 201910727508.4

(51) Int. Cl.
*H01M 4/30*      (2006.01)
*C01B 33/02*     (2006.01)
(Continued)

(52) U.S. Cl.
CPC ............. *H01M 4/366* (2013.01); *C01B 33/02* (2013.01); *C01B 33/113* (2013.01);
(Continued)

(58) Field of Classification Search
CPC ...... H01M 4/366; H01M 4/386; H01M 4/483; H01M 2004/027
See application file for complete search history.

(56) References Cited

U.S. PATENT DOCUMENTS

2016/0006024 A1   1/2016   Xiao et al.
2019/0157669 A1   5/2019   Burshtain et al.

FOREIGN PATENT DOCUMENTS

CN   101246954 A   8/2008
CN   103189761 A   7/2013
(Continued)

OTHER PUBLICATIONS

Kang et al., "Poly(acrylic acid) Grafted with a Boronic Ester and Dopamine as a Self-Healable and Highly Adhesive Aqueous Binder for Si Anodes", ACS Appl. Energy Mater. 2024, 7, 6, 2436-2450, https://doi.org/10.1021/acsaem.3c03256 (Year: 2024).*

(Continued)

*Primary Examiner* — Nicholas A Smith
*Assistant Examiner* — Ziheng Lu
(74) *Attorney, Agent, or Firm* — Dilworth IP, LLC (57) ABSTRACT

The present application provides a silicon-based negative electrode material and a preparation method and use thereof. The silicon-based negative electrode material has a lithium borate coating layer on its surface, which may improve first charge-discharge efficiency of the material. There is a strong chemical bond interaction between the lithium borate coating layer and the borate ester having a specific structure, which may improve the rate capability of the battery. Furthermore, the borate ester has a structure of $-(CH_2CH_2O)_n-CO-CR_0=CH_2$, and the negative plate prepared with the silicon-based negative electrode material will undergo a cross-linking reaction during a high-temperature baking of the plate, so that a cross-linking is formed among particles of the silicon-based negative electrode
(Continued)

material, thereby effectively ensuring the structural integrity of the silicon-based negative electrode plate during recycling, and improving the cycle performance of the battery.

19 Claims, 1 Drawing Sheet

(51) Int. Cl.

| | | |
|---|---|---|
| *C01B 33/113* | (2006.01) | |
| *H01M 4/1395* | (2010.01) | |
| *H01M 4/36* | (2006.01) | |
| *H01M 4/38* | (2006.01) | |
| *H01M 4/48* | (2010.01) | |
| *H01M 4/58* | (2010.01) | |
| *H01M 4/60* | (2006.01) | |
| *H01M 10/0525* | (2010.01) | |
| *H01M 4/02* | (2006.01) | |

(52) U.S. Cl.
CPC ......... *H01M 4/1395* (2013.01); *H01M 4/364* (2013.01); *H01M 4/386* (2013.01); *H01M 4/483* (2013.01); *H01M 4/5825* (2013.01); *H01M 4/602* (2013.01); *H01M 10/0525* (2013.01); *C01P 2004/61* (2013.01); *C01P 2004/62* (2013.01); *C01P 2004/64* (2013.01); *C01P 2006/40* (2013.01); *H01M 2004/021* (2013.01); *H01M 2004/027* (2013.01)

(56) References Cited

FOREIGN PATENT DOCUMENTS

| CN | 103208617 A | 7/2013 |
|---|---|---|
| CN | 103311511 A | 9/2013 |
| CN | 103996835 A | 8/2014 |
| CN | 105406121 A | 3/2016 |
| CN | 108172757 A | 6/2018 |
| CN | 108341962 A | 7/2018 |
| CN | 109755495 A | 5/2019 |
| JP | 2008135382 A | 6/2008 |
| JP | 6260735 B1 | 1/2018 |

OTHER PUBLICATIONS

CN108172757A machine translated description (Year: 2018).*
CN103311511A machine translated description (Year: 2013).*
First Office Action in CN Patent Application No. 201910727508.4 dated Jul. 5, 2021.
International Search Report in International Application No. PCT/CN2020/107849 dated Nov. 6, 2020.
Notice of Allowance in CN Patent Application No. 201910727508.4 dated Jan. 10, 2022.

* cited by examiner

SILICON-BASED NEGATIVE ELECTRODE MATERIAL, PREPARATION METHOD AND USE THEREOF

CROSS-REFERENCE TO RELATED APPLICATIONS

This application is a continuation of International Application No. PCT/CN2020/107849, filed on Aug. 7, 2020, which claims priority to Chinese Patent Application No. 201910727508.4, filed on Aug. 7, 2019. The disclosures of the aforementioned applications are hereby incorporated by reference in their entireties.

TECHNICAL FIELD

The present application relates to the technical field of lithium ion batteries, and in particular, to a silicon-based negative electrode material and a preparation method and a use thereof.

BACKGROUND

Lithium ion batteries have the characteristics of high energy density, long cycle life and environment friendliness, and have been widely applied to electronic products such as mobile communication equipment, notebook computers, digital cameras, etc., and gradually play a role in the field of electric vehicles and energy storage. Negative electrode material is one of key materials for lithium ion batteries. Currently, graphite is the most widely applied negative electrode material for commercial lithium ion batteries and has a theoretical specific capacity of 372 mAh/g, and cannot meet the requirements of high energy density lithium ion batteries. The theoretical specific capacity of silicon-based negative electrode material may reach 4200 mAh/g and significantly improve energy density of batteries by replacing graphite cathode, and it is a very promising next-generation negative electrode material.

However, the volume of silicon-based materials will change greatly during the process of intercalation/deintercalation of lithium, resulting in poor cycle performance and low first charge-discharge efficiency. The current solution mainly lies in nanocrystallization of silicon-based materials, and compounding of silicon-based materials with carbon-based materials, which may improve the performance of silicon-based materials to a certain extent. However, the performance of the current silicon-based materials still needs to be further improved.

SUMMARY

In order to improve the deficiencies of the prior art, the purpose of this application is to provide a silicon-based negative electrode material and a preparation method and use thereof. The silicon-based negative electrode material may improve cycle performance, first charge-discharge efficiency and lithium ion conductivity of the silicon-based material, thereby improving cycle life of the lithium ion battery, increasing energy density of the lithium ion battery, and improving rate capability of the lithium ion battery.

In order to achieve the above purpose, the present application adopts the following technical solutions:

This application provides a silicon-based negative electrode material, where the silicon-based negative electrode material has a core-shell structure, and borate ester is grafted on an outer surface of a layer of the shell; a material for forming the core includes silicon powder and/or silicon monoxide powder, and a material for forming the shell includes lithium borate ($Li_3BO_3$).

According to the present application, the borate ester accounts for 0.01-2 wt % of the silicon-based negative electrode material.

According to the present application, the core has an average particle size of 1 nm-10 μm.

According to the present application, the layer of the shell has a thickness of 0.1-100 nm.

According to the present application, the borate ester is selected from one or more compounds having a structure represented by formula (1):

Formula (1)

where, n is an integer between 0 and 10000, $R_1$ and $R_2$ are the same or different, and are each independently selected from H, alkyl, alkoxy, alkenyl, alkenyloxy, aryl, aryloxy, —$COCR_0$=$CH_2$, —$OCOCR_0$=$CH_2$, —$O(CH_2CH_2O)_{y1}COCR_0$=$CH_2$ (y1 is an integer greater than or equal to 0), —$O(CH_2CH_2O)_{y2}R_0$ (y2 is an integer greater than or equal to 1), —$(CH_2CH_2O)_{y3}R_0$ (y3 is an integer greater than or equal to 1), —$(CH_2CH_2O)_{y4}COCR_0$=$CH_2$ (y4 is an integer greater than or equal to 0);

$R_0$ is selected from H, alkyl, aryl, or aryl substituted with one or more F atoms;

where, n, y1, y2, y3, and y4 respectively represent an average degree of polymerization of corresponding repeating units.

Preferably, $R_1$ and $R_2$ are the same or different, and are each independently selected from $C_{1-6}$ alkyl, —$OC_{1-6}$ alkyl, $C_{2-6}$ alkenyl, —$OC_{2-6}$ alkenyl, —$C_6H_5$, —$OC_6H_5$, —$COCH$=$CH_2$, —$OCOCR_0$=$CH_2$, —$O(CH_2CH_2O)_{y1}COCR_0$=$CH_2$ (y1 is a integer between 0 and 10), —$O(CH_2CH_2O)_{y2}R_0$ (y2 is an integer between 1 and 8), —$(CH_2CH_2O)_{y3}R_0$ (y3 is an integer between 1 and 5), —$CH_2CH_2O)_{y4}COCR_0$=$CH_2$ (y4 is an integer between 0 and 5); where, $R_0$ is defined as above.

Preferably, $R_0$ is selected from H, $C_{1-6}$ alkyl, —$C_{6-15}$ or —$C_{6-15}$ substituted with one or more F atoms.

In this application, $R_1$ and $R_2$ groups in the borate ester will be partially hydrolyzed, and B atom will be bonded to the surface of the inorganic lithium borate, so as to be grafted on the surface of the lithium borate to obtain the silicon-based negative electrode material.

"Alkyl" used alone or as a suffix or prefix in the present application is intended to include linear or branched saturated aliphatic hydrocarbon radicals with 1 to 20, preferably 1-6 carbon atoms. For example, "$C_{1-6}$ alkyl" means linear or branched alkyls with 1, 2, 3, 4, 5 or 6 carbon atoms, "$C_{2-4}$ alkyl" means linear or branched alkyls with 2, 3 or 4 carbon atoms. Examples of alkyls include, but are not limited to, methyl, ethyl, n-propyl, isopropyl, n-butyl, isobutyl, sec-butyl, tert-butyl, n-pentyl, and n-hexyl.

"Alkenyl" used alone or as a suffix or prefix in the present application is intended to include linear or branched aliphatic hydrocarbon radicals containing alkenyl with 2 to 20, preferably 2-6 carbon atoms. For example, "$C_{2-6}$ alkenyl" means alkenyls with 2, 3, 4, 5 or 6 carbon atoms. Examples of alkenyl include, but are not limited to, vinyl, allyl, 1-propenyl, 1-butenyl, 2-butenyl, 3-butenyl, 2-methyl-2-butenyl, 3-methyl-1-butenyl, 1-pentenyl, 3-pentenyl and 4-hexenyl.

The term "aryl" used in this application refers to an aromatic ring structure composed of 5 to 20 carbon atoms. For example, aromatic ring structures containing 5, 6, 7 or 8 carbon atoms may be monocyclic aromatic groups, such as phenyl; aromatic ring structures containing 8, 9, 10, 11, 12, 13 or 14 carbon atoms may be polycyclic aromatic groups, such as naphthyl, anthracyl, phenanthryl. The term "aryl" also includes polycyclic ring systems with two or more rings, where two or more carbons are shared by two adjacent rings (the rings are "condensed rings"), and at least one of rings is aromatic and the other rings may be, for example, cycloalkyl, cycloalkenyl, cycloalkynyl, aryl and/or heterocyclyl. Examples of polycyclic aromatic group include, but are not limited to, 2,3-dihydro-1,4-benzodioxin and 2,3-dihydro-1-benzofuran.

"Alkyl" in the term "alkoxy" used in this application is defined as above.

"Aryl" in the term "aryloxy" used in this application is defined as above.

According to the present application, the silicon-based negative electrode material has a specific surface area of 0.5-1000 m$^2$/g.

The present application also provides a preparation method of the above silicon-based negative electrode material, including the following steps:
1) mixing silicon powder and/or silicon monoxide powder with lithium borate powder to obtain a mixed powder, and calcining the obtained mixed powder under the protection of an inert atmosphere to obtain a material with a core-shell structure, a material for forming the core including silicon powder and/or silicon monoxide powder, and a material for forming the shell including lithium borate;
2) mixing and reacting the material with a core-shell structure in step 1) with borate ester, organic solvent and water to prepare the silicon-based negative electrode material.

According to the present application, in step 1), the mixing is performed, for example, in a ball mill for 2-24 h.

According to the present application, in step 1), calcination temperature is 800-1000° C., and calcination time is 0.1-12 h. In the calcination process, the lithium borate powder is melted at high temperature and then coated on the surface of silicon powder and/or silicon monoxide powder to obtain the material with a core-shell structure.

According to the present application, in step 1), a mass ratio of the silicon powder and/or silicon monoxide powder to the lithium borate is (95-99.9):(5-0.1).

According to the present application, in step 1), the inert atmosphere refers to an atmosphere that does not react with reaction system, such as nitrogen, inert gas, etc.

According to the present application, in step 2), the organic solvent is at least one selected from ethanol, acetone, toluene and xylene.

According to the present application, in step 2), a reaction is carried out at a temperature of 20-100° C. for 0.1-24 h, for example, under stirring condition.

According to the present application, in step 2), a mass ratio of the borate ester, the organic solvent and the water is (0.1-99.8%):(0.1-99.8%):(0.1-99.8%).

According to the present application, in step 2), a mass ratio of the material with a core-shell structure in step 1) and the borate ester is (1-80):(99-20); and the borate ester accounts for 0.01-2 wt % of the content of the resultant final product.

In the present application, the borate ester will be grafted on the surface of the shell layer during the reaction process. When the entire surface of the shell layer is grafted with borate ester, no more grafting reactions can be carried out. At this time, the content level of the borate ester in the final product depends on the molecular weight of the borate ester. The larger the molecular weight of the borate ester, the greater the mass proportion of the borate ester in the final product.

According to the present application, the method further includes post-processing steps: filtering or centrifuging a mixed system after reaction to remove liquid so as to obtain a precipitate, washing the precipitate with organic solvent or water, and drying.

According to the present application, the method specifically includes the following steps:
S1: mixing silicon powder and/or silicon monoxide powder with lithium borate powder uniformly to obtain a mixed powder, ball-milling the mixed powder with a ball mill for 2-24 h to obtain a milled powder, and calcining the milled powder at 800-1000° C. for 0.1-12 h under the protection of an inert atmosphere to obtain a material with a core-shell structure, where a material for forming the core includes silicon powder and/or silicon monoxide powder, and a material for forming the shell includes lithium borate;
S2: mixing borate ester, organic solvent and water uniformly to form a mixed solution; then adding the material with a core-shell structure to the mixed solution to obtain a solution, keeping the obtained solution at 20-100° C., and stirring for 0.1-24 h, filtering or centrifuging to remove liquid so as to obtain a precipitate, washing the precipitate with organic solvent or water, and drying to obtain the silicon-based negative electrode material.

The present application also provides a silicon-based negative electrode material, which is obtained by the above preparation method.

The present application also provides a use of the above silicon-based negative electrode material in liquid lithium ion battery or gel state lithium ion battery or solid lithium ion battery.

The present application also provides a liquid lithium ion battery, which includes a positive plate, a negative plate, a separator, and an electrolyte solution, where the negative plate is prepared by using the above silicon-based negative electrode material.

The present application also provides a gel state lithium ion battery, which includes a positive plate, a negative plate, and a gel electrolyte membrane, where the negative plate is prepared by using the above silicon-based negative electrode material.

The present application also provides a solid lithium ion battery, which includes a positive plate, a negative plate, and a solid electrolyte membrane, where the negative plate is prepared by using the above silicon-based negative electrode material.

BENEFICIAL EFFECTS OF THIS APPLICATION

The present application provides a silicon-based negative electrode material and a preparation method and use thereof, where the silicon-based negative electrode material has a lithium borate coating layer on its surface, and the coating layer may effectively weaken side reactions on the negative electrode surface and improve first charge-discharge efficiency of the silicon-based negative electrode material; there is a strong chemical bond interaction between the lithium borate coating layer and borate ester with a specific structure, which is conducive to lithium ion transmission and may improve the rate capability of the battery; furthermore, the borate ester has a structure of $-(CH_2CH_2O)_n-CO-CR_0=CH_2$, the negative plate prepared with the silicon-based negative electrode material will undergo a cross-linking reaction during high-temperature baking of the plate, so as to form cross-linking among particles of the silicon-based negative electrode material, thereby effectively ensuring the structural integrity of the silicon-based negative electrode plate during recycling, and further improving the cycle performance of the battery.

DESCRIPTION OF EMBODIMENTS

Figure 1:
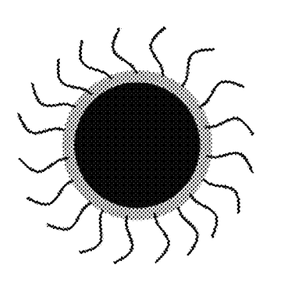
FIG. 1 is a structural schematic diagram of a silicon-based negative electrode material.

The preparation method of the present application will be described in further detail below with reference to specific examples. It should be understood that the following examples are only illustrative to illustrate and explain the present application, and should not be construed as limiting the protection scope of the present application. All technologies implemented based on the above content of this application are covered within the scope of protection intended by this application.

Experimental methods used in the following examples are conventional methods unless otherwise specified; and reagents, materials, etc. used in the following examples may be available from commercial approaches unless otherwise specified.

The definitions of borate esters B1-B8 used in the following examples are as shown in Table 1 below:

TABLE 1

| Borate ester | n | $R_1$ | $R_2$ | $R_0$ |
|---|---|---|---|---|
| B1 | 3 | $-OCH_3$ | $-O(CH_2CH_2O)_{10}COCH=CH_2$ | $-H$ |
| B2 | 8 | $-C_2H_5$ | $-(CH_2CH_2O)_5COC(C_2H_5)=CH_2$ | $-CH_3$ |
| B3 | 15 | $-CH_2CH=CH_3$ | $-O(CH_2CH_2O)_8CH_3$ | $-C_6H_5$ |
| B4 | 20 | $-OCH_2CH_2CH=CH_3$ | $-(CH_2CH_2O)_3C_2H_5$ | $-C_2H_5$ |
| B5 | 58 | $-C_6H_5$ | $-OCH_3$ | $-C_3H_7$ |
| B6 | 128 | $-OC_6H_5$ | $-OC_6H_5$ | $-C_6F_5$ |
| B7 | 450 | $-COCH=CH_2$ | $-C_4H_9$ | $-C_6H_4F$ |
| B8 | 950 | $-OCOC(CH_3)=CH_2$ | $-COCH=CH_2$ | $-C_4H_9$ |

Example 1

99.9 parts (part by mass, the same below) of silicon powder having an average particle size of 1 nm was mixed with 0.1 parts of lithium borate powder uniformly to obtain a mixed powder. The mixed powder was subjected to ball-milling with a ball mill for 2 h to obtain a milled powder. After that, the milled powder was calcined at 1000° C. for 0.1 h under the protection of an inert atmosphere to obtain a material with a core-shell structure (referred to as M1), where a material for forming the core included silicon powder, the material for forming the shell included lithium borate, and the thickness of a shell layer was 0.1 nm.

Borate ester B1, toluene and water were mixed uniformly to form a mixed solution, where water accounted for 0.1% by mass fraction of the mixed solution, toluene accounted for 0.1% by mass fraction of the mixed solution, and borate ester B1 accounted for 99.8% by mass fraction of the mixed solution. Then, 1 parts by mass of M1 was added to 99 parts by mass of the above mixed solution to obtain a solution. After that, the obtained solution was kept at 100° C., stirred for 24 h, and filtered to remove liquid, obtaining a precipitate. The obtained precipitate was washed with toluene, and then dried to obtain the silicon-based negative electrode material of the present application.

A liquid lithium ion battery was obtained by assembling the obtained silicon-based negative electrode material with lithium cobaltate positive electrode, polyethylene separator and conventional commercial electrolyte for lithium ion battery. The rate capability (test method: a discharge capacity retention rate is tested at 3C rate), the cycle performance at 25° C. and 1C/1C charge-discharge condition, and the first charge-discharge efficiency and energy density, of the obtained liquid lithium ion battery, were tested.

Comparative Example 1a

A negative electrode was prepared from silicon powder with an average particle size of 1 nm, and then assembled with lithium cobaltate positive electrode, polyethylene separator and conventional commercial electrolyte for lithium ion battery to obtain a liquid lithium ion battery. The rate capability (test method: a discharge capacity retention rate is tested at 3C rate), the cycle performance at 25° C. and 1C/1C charge-discharge condition, and the first charge-discharge efficiency and energy density, of the obtained liquid lithium ion battery, were tested.

Comparative Example 1b

A negative electrode was prepared from M1 in Example 1, and then assembled with lithium cobaltate positive electrode, polyethylene separator and conventional commercial electrolyte for lithium ion battery to obtain a liquid lithium ion battery. The rate capability (test method: a discharge capacity retention rate is tested at 3C rate), the cycle performance at 25° C. and 1C/1C charge-discharge condition, and the first charge-discharge efficiency and energy density, of the obtained liquid lithium ion battery, were tested.

Example 2

95 parts of silicon monoxide powder having an average particle size of 10 μm was mixed with 5 parts of lithium borate powder uniformly to obtain a mixed powder. The mixed powder was subjected to ball-milling with a ball mill for 24 h to obtain a milled powder. After that, the milled powder was calcined at 800° C. for 12 h under the protection of an inert atmosphere to obtain a material with a core-shell structure (referred to as M2), where a material for forming the core included silicon monoxide powder, the material for forming the shell included lithium borate, and the thickness of the shell layer was 100 nm.

Borate ester B2, acetone and water were mixed uniformly to form a mixed solution, where water accounted for 99.8% by mass fraction of the mixed solution, acetone accounted for 0.1% by mass fraction of the mixed solution, and borate ester B2 accounted for 0.1% by mass fraction of the mixed solution. Then, 10 parts by mass of M2 was added to 90 parts by mass of the above mixed solution to obtain a solution. After that, the obtained solution was kept at 20° C., stirred for 0.1 h, and filtered to remove liquid, obtaining a precipitate. The obtained precipitate was washed with water, and then dried to obtain the silicon-based negative electrode material of the present application.

A liquid lithium ion battery was obtained by assembling the obtained silicon-based negative electrode material with lithium iron phosphate positive electrode, polyethylene-ceramic composite separator and conventional commercial electrolyte for lithium ion battery. The rate capability (test method: a discharge capacity retention rate is tested at 3C rate), the cycle performance at 25° C. and 1C/1C charge-discharge condition, and the first charge-discharge efficiency and energy density, of the obtained liquid lithium ion battery, were tested.

Comparative Example 2a

A negative electrode was prepared from silicon monoxide powder with an average particle size of 10 μm, and then assembled with lithium iron phosphate positive electrode, polyethylene-ceramic composite separator and conventional commercial electrolyte for lithium ion battery to obtain a liquid lithium ion battery. The rate capability (test method: a discharge capacity retention rate is tested at 3C rate), the cycle performance at 25° C. and 1C/1C charge-discharge condition, and the first charge-discharge efficiency and energy density, of the obtained liquid lithium ion battery, were tested.

Comparative Example 2b

A negative electrode was prepared from M2 in Example 2, and then assembled with lithium iron phosphate positive electrode, polyethylene-ceramic composite separator and conventional commercial electrolyte for lithium ion battery to obtain a liquid lithium ion battery. The rate capability (test method: a discharge capacity retention rate is tested at 3C rate), the cycle performance at 25° C. and 1C/1C charge-discharge condition, and the first charge-discharge efficiency and energy density, of the obtained liquid lithium ion battery, were tested.

Example 3

98 parts of silicon monoxide powder having an average particle size of 1 μm was mixed with 2 parts of lithium borate powder uniformly to obtain a mixed powder. The mixed powder was subjected to ball-milling with a ball mill for 4 h to obtain a milled powder. After that, the milled powder was calcined at 900° C. for 6 h under the protection of an inert atmosphere to obtain a material with a core-shell structure (referred to as M3), where a material for forming the core included silicon monoxide powder, the material for forming the shell included lithium borate, and the thickness of the shell layer was 15 nm.

Borate ester B3, ethanol and water were mixed uniformly to form a mixed solution, where water accounted for 50% by mass fraction of the mixed solution, ethanol accounted for 48% by mass fraction of the mixed solution, and borate ester B3 accounted for 2% by mass fraction of the mixed solution. Then, 50 parts by mass of M3 was added to 50 parts by mass of the above mixed solution to obtain a solution. After that, the obtained solution was kept at 50° C., stirred for 1 h, and filtered to remove liquid, obtaining a precipitate. The obtained precipitate was washed with ethanol, and then dried to obtain the silicon-based negative electrode material of the present application.

A gel state lithium ion battery was obtained by assembling the obtained silicon-based negative electrode material with nickel-cobalt-manganese (NCM622) ternary positive electrode and PVDF (polyvinylidene fluoride) gel state electrolyte membrane. The rate capability (test method: a discharge capacity retention rate is tested at 3C rate), the cycle performance at 25° C. and 1C/1C charge-discharge condition, and the first charge-discharge efficiency and energy density, of the obtained gel state lithium ion battery, were tested.

Comparative Example 3a

A negative electrode was prepared from silicon monoxide powder with an average particle size of 1 μm, and then assembled with nickel-cobalt-manganese (NCM622) ternary positive electrode and PVDF gel state electrolyte membrane to obtain a gel state lithium ion battery. The rate capability (test method: a discharge capacity retention rate is tested at 3C rate), the cycle performance at 25° C. and 1C/1C charge-discharge condition, and the first charge-discharge efficiency and energy density, of the obtained gel state lithium ion battery, were tested.

Comparative Example 3b

A negative electrode was prepared from M3 in Example 3, and then assembled with nickel-cobalt-manganese (NCM622) ternary positive electrode and PVDF gel state electrolyte membrane to obtain a gel state lithium ion battery. The rate capability (test method: a discharge capacity retention rate is tested at 3C rate), the cycle performance at 25° C. and 1C/1C charge-discharge condition, and the first charge-discharge efficiency and energy density, of the obtained gel state lithium ion battery, were tested.

Example 4

99 parts of silicon powder having an average particle size of 50 nm was mixed with 1 parts of lithium borate powder uniformly to obtain a mixed powder. The mixed powder was subjected to ball-milling with a ball mill for 6 h to obtain a milled powder. After that, the milled powder was calcined at 850° C. for 8 h under the protection of an inert atmosphere to obtain a material with a core-shell structure (referred to as M4), where a material for forming the core included silicon powder, the material for forming the shell included lithium borate, and the thickness of the shell layer was 3 nm.

Borate ester B4, xylene and water were mixed uniformly to form a mixed solution, where water accounted for 98% by mass fraction of the mixed solution, xylene accounted for 0.5% by mass fraction of the mixed solution, and borate ester B4 accounted for 1.5% by mass fraction of the mixed solution. Then, 40 parts by mass of M4 was added to 60 parts by mass of the above mixed solution to obtain a solution. After that, the obtained solution was kept at 30° C., stirred for 0.5 h, and filtered to remove liquid, obtaining a precipitate. The obtained precipitate was washed with ethanol, and then dried to obtain the silicon-based negative electrode material of the present application.

A solid lithium ion battery was obtained by assembling the obtained silicon-based negative electrode material with nickel-cobalt-manganese ternary positive electrode and sulfide solid electrolyte membrane. The rate capability (test method: a discharge capacity retention rate is tested at 3C rate), the cycle performance at 25° C. and 1C/1C charge-discharge condition, and the first charge-discharge efficiency and energy density, of the obtained solid lithium ion battery, were tested.

Comparative Example 4b

A negative electrode was prepared from silicon powder with an average particle size of 50 nm, and then assembled with nickel-cobalt-manganese ternary positive electrode and sulfide solid electrolyte membrane to obtain a solid lithium ion battery. The rate capability (test method: a discharge capacity retention rate is tested at 3C rate), the cycle performance at 25° C. and 1C/1C charge-discharge condition, and the first charge-discharge efficiency and energy density, of the obtained solid lithium ion battery, were tested.

Comparative Example 4b

A negative electrode was prepared from M4 in Example 4, and then assembled with nickel-cobalt-manganese ternary positive electrode and sulfide solid electrolyte membrane to obtain a solid lithium ion battery. The rate capability (test method: a discharge capacity retention rate is tested at 3C rate), the cycle performance at 25° C. and 1C/1C charge-discharge condition, and the first charge-discharge efficiency and energy density, of the obtained solid lithium ion battery, were tested.

Example 5

98.5 parts of silicon monoxide powder having an average particle size of 500 nm was mixed with 1.5 parts of lithium borate powder uniformly to obtain a mixed powder. The mixed powder was subjected to ball-milling with a ball mill for 5 h to obtain a milled powder. After that, the milled powder was calcined at 920° C. for 1.5 h under the protection of an inert atmosphere to obtain a material with a core-shell structure (referred to as M5), where a material for forming the core included silicon monoxide powder, the material for forming the shell included lithium borate, and the thickness of the shell layer was 2.5 nm.

Borate ester B5, borate ester B6, ethanol and water were mixed uniformly to form a mixed solution, where water accounted for 20% by mass fraction of the mixed solution, ethanol accounted for 70% by mass fraction of the mixed solution, borate ester B5 accounted for 5% by mass fraction of the mixed solution, and borate ester B6 accounted for 5% by mass fraction of the mixed solution. Then, 80 parts by mass of M5 was added to 20 parts by mass of the above mixed solution to obtain a solution. After that, the obtained solution was kept at 50° C., stirred for 3 h, and filtered to remove liquid, obtaining a precipitate. The obtained precipitate was washed with mixed solvent of ethanol and water, and then dried to obtain the silicon-based negative electrode material of the present application.

A solid lithium ion battery was obtained by assembling the obtained silicon-based negative electrode material with nickel-cobalt-manganese ternary positive electrode and sulfide solid electrolyte membrane. The rate capability (test method: a discharge capacity retention rate is tested at 3C rate), the cycle performance at 25° C. and 1C/1C charge-discharge condition, and the first charge-discharge efficiency and energy density, of the obtained solid lithium ion battery, were tested.

Comparative Example 5a

A negative electrode was prepared from silicon monoxide powder with an average particle size of 500 nm, and then assembled with nickel-cobalt-manganese ternary positive electrode and sulfide solid electrolyte membrane to obtain a solid lithium ion battery. The rate capability (test method: a discharge capacity retention rate is tested at 3C rate), the cycle performance at 25° C. and 1C/1C charge-discharge condition, and the first charge-discharge efficiency and energy density, of the obtained solid lithium ion battery, were tested.

Comparative Example 5b

A negative electrode was prepared from M5 in Example 5, and then assembled with nickel-cobalt-manganese ternary positive electrode and sulfide solid electrolyte membrane to obtain a solid lithium ion battery. The rate capability (test method: a discharge capacity retention rate is tested at 3C rate), the cycle performance at 25° C. and 1C/1C charge-discharge condition, and the first charge-discharge efficiency and energy density, of the obtained solid lithium ion battery, were tested.

Example 6

99.5 parts of silicon powder having an average particle size of 5 nm was mixed with 0.5 parts of lithium borate powder uniformly to obtain a mixed powder. The mixed powder was subjected to ball-milling with a ball mill for 3.5 h to obtain a milled powder. After that, the milled powder was calcined at 820° C. for 1 h under the protection of an inert atmosphere to obtain a material with a core-shell structure (referred to as M6), where a material for forming the core included silicon powder, the material for forming the shell included lithium borate, and the thickness of the shell layer was 0.5 nm.

Borate ester B7, borate ester B8, ethanol and water were mixed uniformly to form a mixed solution, where water accounted for 10% by mass fraction of the mixed solution, ethanol accounted for 77% by mass fraction of the mixed solution, borate ester B7 accounted for 10% by mass fraction of the mixed solution, and borate ester B8 accounted for 3% by mass fraction of the mixed solution. Then, 60 parts by mass of M6 was added to 40 parts by mass of the above mixed solution to obtain a solution. After that, the obtained solution was kept at 70° C., stirred for 1 h, and filtered to remove liquid, obtaining a precipitate. The obtained precipitate was washed with ethanol, and then dried to obtain the silicon-based negative electrode material of the present application.

A gel state lithium ion battery was obtained by assembling the obtained silicon-based negative electrode material with lithium cobaltate positive electrode and PVDF (polyvinylidene fluoride) gel state electrolyte membrane. The rate capability (test method: a discharge capacity retention rate is tested at 3C rate), the cycle performance at 25° C. and 1C/1C charge-discharge condition, and the first charge-discharge efficiency and energy density, of the obtained gel state lithium ion battery, were tested.

Comparative Example 6a

A negative electrode was prepared from silicon powder with an average particle size of 5 nm, and then assembled with lithium cobaltate positive electrode and PVDF (polyvinylidene fluoride) gel state electrolyte membrane to obtain a gel state lithium ion battery. The rate capability (test method: a discharge capacity retention rate is tested at 3C rate), the cycle performance at 25° C. and 1C/1C charge-discharge condition, and the first charge-discharge efficiency and energy density, of the obtained gel state lithium ion battery, were tested.

Comparative Example 6b

A negative electrode was prepared from M6 in Example 6, and then assembled with lithium cobaltate positive electrode and PVDF (polyvinylidene fluoride) gel state electrolyte membrane to obtain a gel state lithium ion battery. The rate capability (test method: a discharge capacity retention rate is tested at 3C rate), the cycle performance at 25° C. and 1C/1C charge-discharge condition, and the first charge-discharge efficiency and energy density, of the obtained gel state lithium ion battery, were tested.

Example 7

99.2 parts of silicon monoxide powder having an average particle size of 100 nm was mixed with 0.8 parts of lithium borate powder uniformly to obtain a mixed powder. The mixed powder was subjected to ball-milling with a ball mill for 1 h to obtain a milled powder. After that, the milled powder was calcined at 880° C. for 1.5 h under the protection of an inert atmosphere to obtain a material with a core-shell structure (referred to as M7), where a material for forming the core included silicon monoxide powder, the material for forming the shell included lithium borate, and the thickness of the shell layer was 2 nm.

Borate ester B1, borate ester B3, borate ester B6, ethanol and water were mixed uniformly to form a mixed solution, where water accounted for 50% by mass fraction of the mixed solution, ethanol accounted for 44% by mass fraction of the mixed solution, borate ester B1 accounted for 2% by mass fraction of the mixed solution, borate ester B3 accounted for 2% by mass fraction of the mixed solution, and borate ester B6 accounted for 2% by mass fraction of the mixed solution. Then, 50 parts by mass of M7 was added to 50 parts by mass of the above mixed solution to obtain a solution. After that, the obtained solution was kept at 45° C., stirred for 5 h, and filtered to remove liquid, obtaining a precipitate. The obtained precipitate was washed with ethanol, and then dried to obtain the silicon-based negative electrode material of the present application.

A liquid lithium ion battery was obtained by assembling the obtained silicon-based negative electrode material with lithium iron phosphate positive electrode, polypropylene (PP)/polyethylene (PE)/polypropylene (PP) three-layered composite separator, and conventional commercial electrolyte for lithium ion battery. The rate capability (test method: a discharge capacity retention rate is tested at 3C rate), the cycle performance at 25° C. and 1C/1C charge-discharge condition, and the first charge-discharge efficiency and energy density, of the obtained liquid lithium ion battery, were tested.

Comparative Example 7a

A negative electrode was prepared from silicon monoxide powder with an average particle size of 100 nm, and then assembled with lithium iron phosphate positive electrode, polypropylene (PP)/polyethylene (PE)/polypropylene (PP) three-layered composite separator, and conventional commercial electrolyte for lithium ion battery to obtain a liquid lithium ion battery. The rate capability (test method: a discharge capacity retention rate is tested at 3C rate), the cycle performance at 25° C. and 1C/1C charge-discharge condition, and the first charge-discharge efficiency and energy density, of the obtained liquid lithium ion battery, were tested.

Comparative Example 7b

A negative electrode was prepared from M7 in Example 7, and then assembled with lithium iron phosphate positive electrode, polypropylene (PP)/polyethylene (PE)/polypropylene (PP) three-layered composite separator, and conventional commercial electrolyte for lithium ion battery to obtain a liquid lithium ion battery. The rate capability (test method: a discharge capacity retention rate is tested at 3C rate), the cycle performance at 25° C. and 1C/1C charge-discharge condition, and the first charge-discharge efficiency and energy density, of the obtained liquid lithium ion battery, were tested.

Example 8

97.8 parts of silicon powder having an average particle size of 20 nm was mixed with 2.2 parts of lithium borate powder uniformly to obtain a mixed powder. The mixed powder was subjected to ball-milling with a ball mill for 4 h to obtain a milled powder. After that, the milled powder was calcined at 840° C. for 2.5 h under the protection of an inert atmosphere to obtain a material with a core-shell structure (referred to as M8), where a material forming the core included silicon powder, the material forming the shell included lithium borate, and the thickness of the shell layer was 8 nm.

Borate ester B2, borate ester B5, borate ester B8, acetone and water were mixed uniformly to form a mixed solution, where water accounted for 2% by mass fraction of the mixed solution, acetone accounted for 76% by mass fraction of the mixed solution, borate ester B2 accounted for 5% by mass fraction of the mixed solution, borate ester B5 accounted for 10% by mass fraction of the mixed solution, and borate ester B8 accounted for 7% by mass fraction of the mixed solution. Then, 50 parts by mass of M8 was added to 50 parts by mass of the above mixed solution to obtain a solution. After that, the obtained solution was kept at 65° C., stirred for 2 h, and filtered to remove liquid, obtaining a precipitate. The obtained precipitate was washed with water, and then dried to obtain the silicon-based negative electrode material of the present application.

A liquid lithium ion battery was obtained by assembling the obtained silicon-based negative electrode material with nickel-cobalt-manganese (NCM523) ternary positive electrode, polyethylene-ceramic composite separator, and conventional commercial electrolyte for lithium ion battery. The rate capability (test method: a discharge capacity retention rate is tested at 3C rate), the cycle performance at 25° C. and 1C/1C charge-discharge condition, and the first charge-discharge efficiency and energy density, of the obtained liquid lithium ion battery, were tested.

Comparative Example 8a

A negative electrode was prepared from silicon powder with an average particle size of 20 nm, and then assembled with nickel-cobalt-manganese (NCM523) ternary positive electrode, polyethylene-ceramic composite separator, and conventional commercial electrolyte for lithium ion battery to obtain a liquid lithium ion battery. The rate capability (test method: a discharge capacity retention rate is tested at 3C rate), the cycle performance at 25° C. and 1C/1C charge-discharge condition, and the first charge-discharge efficiency and energy density, of the obtained liquid lithium ion battery, were tested.

Comparative Example 8b

A negative electrode was prepared from M8 in Example 8, and then assembled with nickel-cobalt-manganese (NCM523) ternary positive electrode, polyethylene-ceramic composite separator, and conventional commercial electrolyte for lithium ion battery to obtain a liquid lithium ion battery. The rate capability (test method: a discharge capacity retention rate is tested at 3C rate), the cycle performance at 25° C. and 1C/1C charge-discharge condition, and the first charge-discharge efficiency and energy density, of the obtained liquid lithium ion battery, were tested.

TABLE 2

Performances of batteries assembled from Examples 1-8 and Comparative Examples 1a-8b

| | First charge-discharge efficiency (%) | Energy density (wh/kg) | Cycle life (time) at 25° C. and 1C/1C | Discharge capacity retention rate at 3C(%) |
|---|---|---|---|---|
| Example 1 | 93.3 | 351 | 2130 | 92.4 |
| Comparative Example 1a | 90.1 | 338 | 1280 | 89.0 |
| Comparative Example 1b | 89.9 | 333 | 1350 | 89.4 |
| Example 2 | 85.7 | 389 | 1410 | 91.6 |
| Comparative Example 2a | 78.8 | 357 | 840 | 88.1 |
| Comparative Example 2b | 78.7 | 355 | 930 | 88.9 |
| Example 3 | 89.2 | 347 | 950 | 96.8 |
| Comparative Example 3a | 86.5 | 336 | 620 | 90.6 |
| Comparative Example 3b | 87.1 | 330 | 710 | 91.2 |
| Example 4 | 92.0 | 350 | 890 | 91.3 |
| Comparative Example 4a | 90.4 | 344 | 600 | 85.3 |
| Comparative Example 4b | 90.0 | 339 | 710 | 86.2 |
| Example 5 | 86.8 | 416 | 910 | 92.7 |
| Comparative Example 5a | 83.6 | 401 | 770 | 86.5 |
| Comparative Example 5b | 83.1 | 402 | 790 | 87.9 |
| Example 6 | 93.2 | 344 | 1230 | 93.9 |
| Comparative Example 6a | 90.4 | 334 | 940 | 88.2 |
| Comparative Example 6b | 90.4 | 333 | 940 | 89.9 |
| Example 7 | 90.9 | 382 | 1310 | 94.4 |
| Comparative Example 7a | 88.5 | 372 | 960 | 90.1 |
| Comparative Example 7b | 89.1 | 370 | 990 | 92.8 |
| Example 8 | 85.1 | 393 | 1180 | 95.6 |
| Comparative Example 8a | 82.6 | 381 | 700 | 89.4 |
| Comparative Example 8b | 82.2 | 377 | 750 | 91.5 |

It can be seen from Table 2 that the first charge-discharge efficiency, the energy density, the cycle life and the rate capability of the lithium ion batteries obtained by using the silicon-based negative electrode material which is prepared by the method of the present application have been significantly improved.

Specifically, the silicon-based negative electrode material has a lithium borate coating layer on the surface, which may effectively attenuate side reactions on the negative electrode surface and improve first charge-discharge efficiency of the material. There is a strong chemical bond interaction between the lithium borate coating layer and the borate ester with a specific structure, which is conducive to lithium ion transmission and may improve the rate capability of the battery. Furthermore, the borate ester has a structure of $-(CH_2CH_2O)_n-CO-CR_0=CH_2$, and the negative plate prepared with such silicon-based negative electrode material will undergo a cross-linking reaction during the high-temperature baking of the plate, so that a cross-linking is formed among particles of the silicon-based negative electrode material, thereby effectively ensuring the structural integrity of the silicon-based negative electrode plate during recycling, and improving the cycle performance of the battery.

In the above, the embodiments of the present application have been described. However, the present application is not limited to the above embodiments. Any modification, equivalent replacement, improvement, etc. made within the spirit and principles of this application shall be included in the scope of protection of this application.

What is claimed is:

1. A silicon-based negative electrode material, wherein the silicon-based negative electrode material has a core-shell structure and borate ester is grafted on an outer surface of a layer of the shell, a material for forming the core comprises at least one of silicon powder and silicon monoxide powder, and a material for forming the shell comprises lithium borate.

2. The silicon-based negative electrode material according to claim 1, wherein the borate ester accounts for 0.01-2% by weight of the silicon-based negative electrode material.

3. The silicon-based negative electrode material according to claim 1, wherein the core has an average particle size of 1 nm-10 μm.

4. The silicon-based negative electrode material according to claim 1, wherein the layer of the shell has a thickness of 0.1-100 nm.

5. The silicon-based negative electrode material according to claim 1, wherein the borate ester is selected from one or more compounds having a structure represented by formula (1):

Formula (1)

in formula (1), n is an integer between 0 and 10000, $R_1$ and $R_2$ are independently selected from H, alkyl, alkoxy, alkenyl, alkenyloxy, aryl, aryloxy, —COCR$_0$=CH$_2$, —OCOCR$_0$=CH$_2$, —O(CH$_2$CH$_2$O)$_{y1}$COCR$_0$=CH$_2$, —O(CH$_2$CH$_2$O)$_{y2}$R$_0$, —(CH$_2$CH$_2$O)$_{y3}$R$_0$, —(CH$_2$CH$_2$O)$_{y4}$COCR$_0$=CH$_2$; wherein y1 is an integer greater than or equal to 0, y2 is an integer greater than or equal to 1, y3 is an integer greater than or equal to 1, and y4 is an integer greater than or equal to 0;

$R_0$ is selected from H, alkyl, aryl, or aryl substituted with one or more F atoms;

wherein n, y1, y2, y3, and y4 respectively represent an average degree of polymerization of corresponding repeating units.

6. The silicon-based negative electrode material according to claim 5, wherein R1 and R2 are independently selected from $C_{1-6}$ alkyl, —O$C_{1-6}$ alkyl, $C_{2-6}$ alkenyl, —O$C_{2-6}$ alkenyl, —$C_6H_5$, —O$C_6H_5$, —COCH=CH$_2$, —OCOCR$_0$=CH$_2$, —O(CH$_2$CH$_2$O)$_{y1}$COCR$_0$=CH$_2$, —O(CH$_2$CH$_2$O)$_{y2}$R$_0$, —(CH$_2$CH$_2$O)$_{y3}$R$_0$, —(CH$_2$CH$_2$O)$_{y4}$COCR$_0$=CH$_2$; wherein y1 is an integer between 0 and 10, y2 is an integer between 1 and 8, y3 is an integer between 1 and 5, and y4 is an integer between 0 and 5.

7. The silicon-based negative electrode material according to claim 5, wherein R0 is selected from H, $C_{1-6}$ alkyl, —$C_6H_5$ or —$C_6H_5$ substituted with one or more F atoms.

8. A preparation method of the silicon-based negative electrode material according to claim 1, wherein the preparation method comprises the following steps:
1) mixing at least one of silicon powder and silicon monoxide powder with lithium borate powder to obtain a mixed powder, and calcining the obtained mixed powder under the protection of an inert atmosphere to obtain a material having a core-shell structure, wherein a material for forming the core comprises at least one of silicon powder and silicon monoxide powder, and a material for forming the shell comprises lithium borate;
2) mixing and reacting the material with a core-shell structure in step 1) with borate ester, organic solvent and water, to prepare the silicon-based negative electrode material.

9. The preparation method according to claim 8, wherein in step 1), the mixing is performed in a ball mill for 2-24 h.

10. The preparation method according to claim 8, wherein in step 1), calcination temperature is 800-1000° C., and calcination time is 0.1-12 h.

11. The preparation method according to claim 8, wherein in step 1), a mass ratio of at least one of the silicon powder and silicon monoxide powder to the lithium borate is (95-99.9):(5-0.1).

12. The preparation method according to claim 8, wherein in step 2), the organic solvent is at least one selected from ethanol, acetone, toluene and xylene.

13. The preparation method according to claim 8, wherein in step 2), a reaction is carried out at a temperature of 20-100° C. for 0.1-24 h under stirring conditions.

14. The preparation method according to claim 8, wherein in step 2), a mass ratio of the borate ester, the organic solvent and the water is (0.1-99.8%):(0.1-99.8%):(0.1-99.8%).

15. The preparation method according to claim 8, wherein in step 2), a mass ratio of the material with the core-shell structure in step 1) and the borate ester is (1-80):(99-20).

16. The preparation method according to claim 8, wherein the preparation method further comprises post-processing steps: filtering or centrifuging a mixed system after reaction to remove liquid so as to obtain a precipitate, washing the precipitate with organic solvent or water, and drying.

17. The preparation method according to claim 8, wherein the preparation method comprises the following steps:
1) mixing the at least one of silicon powder and silicon monoxide powder with lithium borate powder uniformly to obtain the mixed powder, ball-milling the mixed powder with a ball mill for 2-24 h to obtain a milled powder, and calcining the milled powder at 800-1000° C. for 0.1-12 h under the protection of an inert atmosphere to obtain the material with the core-shell structure, wherein the material for forming the core comprises the at least one of silicon powder and silicon monoxide powder, and the material for forming the shell comprises lithium borate;
2) mixing the borate ester, organic solvent, and water uniformly to form a mixed solution; then adding the material with the core-shell structure to the mixed solution to obtain a solution, keeping the obtained solution at 20-100° C., and stirring for 0.1-24 h, filtering or centrifuging to remove liquid so as to obtain a precipitate, washing the precipitate with the organic solvent or water, and drying to obtain the silicon-based negative electrode material.

18. A liquid lithium ion battery, comprising a positive plate, a negative plate, a separator, and an electrolyte solution, wherein the negative plate comprises the silicon-based negative electrode material according to claim 1.

19. A lithium ion battery, comprising a positive plate, a negative plate, a separator, and a gel or solid electrolyte membrane, wherein the negative plate comprises the silicon-based negative electrode material according to claim 1.

* * * * *